UNITED STATES PATENT OFFICE.

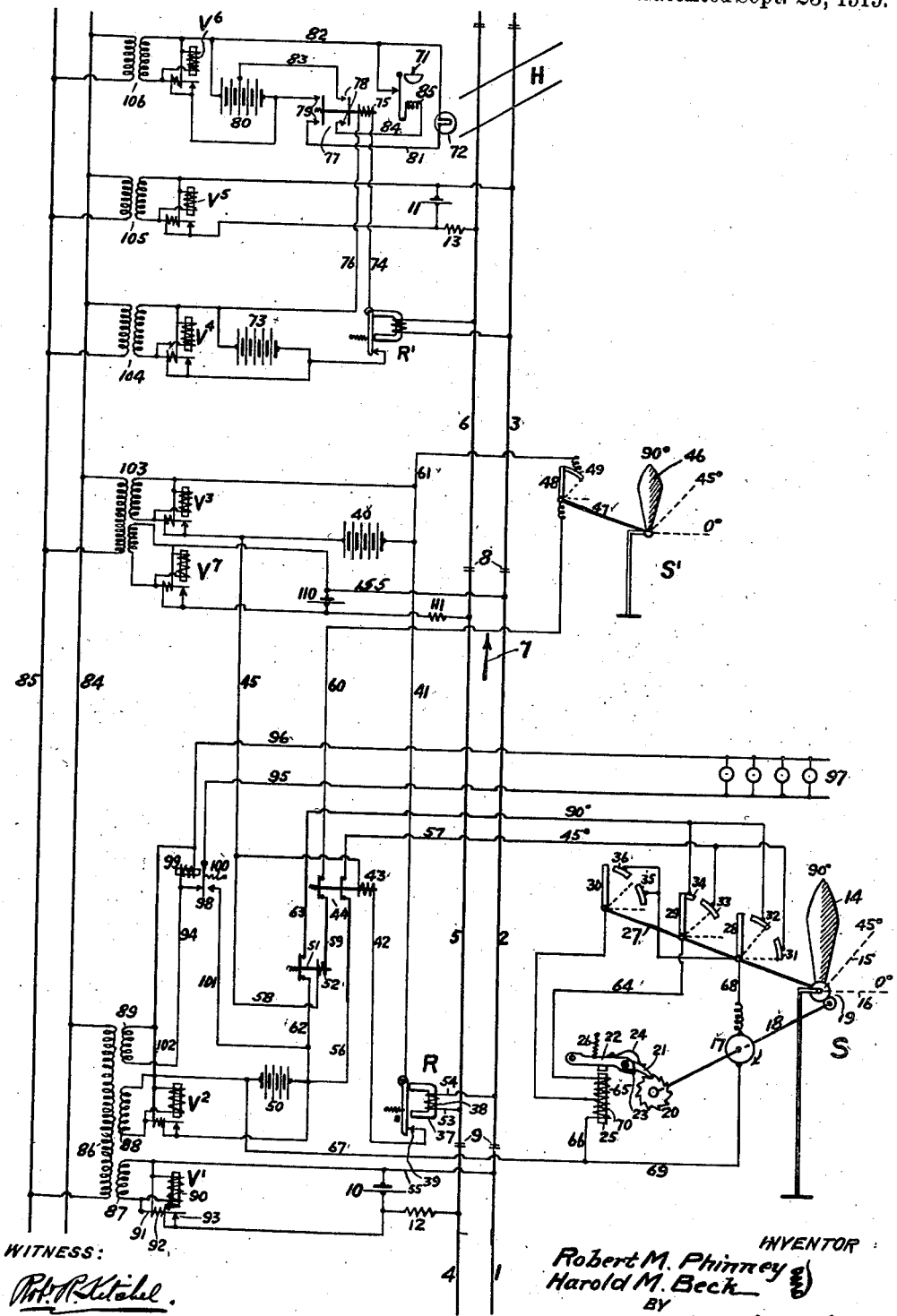

ROBERT M. PHINNEY, OF CHICAGO, AND HAROLD M. BECK, OF HUBBARD WOODS, ILLINOIS, ASSIGNORS TO ELECTRIC STORAGE BATTERY COMPANY, OF PHILADELPHIA, PENNSYLVANIA, A CORPORATION OF NEW JERSEY.

RAILWAY SIGNAL SYSTEM.

1,316,738.      Specification of Letters Patent.      Patented Sept. 23, 1919.

Application filed January 28, 1918. Serial No. 214,180.

*To all whom it may concern:*

Be it known that we, ROBERT M. PHINNEY, of Chicago, in the county of Cook and State of Illinois, and HAROLD M. BECK, of Hubbard Woods, in the county of Cook and State of Illinois, and both citizens of the United States, have jointly invented certain new and useful Improvements in Railway Signal Systems, of which the following is a specification.

Our invention relates to signal systems in which current for operating track relays, semaphore signal arms, signal lights, highway crossing bells and similar apparatus is supplied from a number of storage batteries located at different points along the right-of-way and in which current for charging the batteries is derived from a common source delivered over suitable transmission lines.

Whereas in other similar signal systems it has been the practice to employ two sets of batteries for the same service at each battery location, one of which would be charging from the transmission circuit while the other was discharging to supply current for the signal devices, in our improved system we provide only one battery for a given service at each location, which is connected at all times both to the charging source and to the signal circuit. Batteries for different kinds of service may be of different voltages, and suitable transforming devices are interposed between the transmission lines and the batteries and the same transmission line is used for supplying current to a number of batteries located along the right-of-way, the transforming devices and batteries being connected in parallel to this transmission line.

The object of our invention is to reduce the number of batteries necessary at each location and to reduce the amount of work required from each battery by supplying a considerable proportion of the current required for the signal devices directly from the transmission line.

Our invention will be more clearly understood from the following description in connection with the accompanying drawing, which illustrates, diagrammatically, a signal system embodying the invention.

In the drawing, 1, 2, 3, 4, 5, 6 represent sections of the two parallel rails of a railroad track on which traffic moves in the direction of the arrow 7, these several sections being electrically insulated from each other at the points 8 and 9. The opposite rails of each section are connected respectively to the opposite terminals of track batteries 10, 110, and 11, through suitable resistances 12, 111, and 13, which serve to limit the flow of current from the batteries when the opposite rails are short circuited by a car or train on the section or block.

At S is illustrated a three position semaphore, comprising a signal arm 14, here shown in the vertical or "clear" (90°) position, but capable of assuming either the 45° ("caution") or the 0° ("danger") position, as indicated respectively by the dotted lines 15 and 16. The arm 14 is so balanced that it will fall by gravity into the horizontal position unless arrested and held in either of the other positions. An electric motor 17 is arranged to raise the arm to the vertical position by means of the shaft 18 and the pinion and gear wheel 19, and a ratchet wheel 20 mounted on shaft 18, when engaged by the pawl 21 serves to hold the arm 14 in either the vertical or 45° position. The pawl 21 is pivotally mounted on a lever arm 22, and is held against a stop 23 on said lever arm by means of the spring 24. By reason of the attraction of the electro-magnet 25, overcoming the force of the retractile spring 26, the lever arm 22 is held in the position shown, so that the pawl 21 engages the ratchet wheel 20, thus permitting the motor 17, by rotation in the direction of the arrow, to raise the arm 14 from the horizontal position to either the 45° or the vertical position, but preventing said arm from falling back when the motor ceases to act. If the excitation of the electro-magnet is interrupted, the spring 26 will retract the arm 22, taking the pawl 21 out of engagement with the wheel 20, and permitting the arm 14 to fall by its own weight.

The arm 14 is attached to a shaft 27, which carries three contact fingers 28, 29 and 30. These fingers, moving with the shaft 27, may each assume three different positions corresponding to the three positions of the signal arm 14, thereby making contact with the several stationary contacts 31, 32, 33, 34, 35, 36, and establishing circuits for controlling the signal arm as will be described below.

At S¹ is shown a semaphore similar to that shown at S and it may be operated by similar means not shown. Its signal arm 46 is mounted on a shaft 47, which carries a contact finger 48 which may assume any one of three positions shown by dotted lines corresponding to those of the signal arm. In the vertical position and also in the 45° position this finger makes contact with contact plate 49, 44 and 51 are two relays, the former closing two circuits and the latter one circuit, when suitably excited. 40 and 50 are storage batteries adapted to furnish current for operating the electrical devices shown.

The method of operation of the apparatus thus far described is as follows:

When there are no trains passing over the tracks, the signal arms 14 and 46 will stand in the vertical or "clear" position as shown. Coil 38 of relay R will be excited by current from battery 110 passing via resistance 111, rail 5, conductor 53, coil 38, conductor 54, rail 2, conductor 155. Contact 39 will be held closed, and current from battery 40 will flow via 41, 39, 42, 43 and 45. Relay 44 will be energized by this current in coil 43, closing two circuits. The first of these circuits starting from battery 50 via 56 and 57 is open at contacts 31 and 33, and no current flows. The second permits current to flow from battery 40 via 45, 58, 52, 59, 60, 48, 49 and 61, thus energizing relay 51, and closing a circuit from battery 50 via 62, 63, 34, 29, 64, 65, 66, 67. This energizes coil 65 of electromagnet 25, holding the pawl 21 against ratchet wheel 20 and preventing signal arm 14 from falling. If now, a train runs onto section 2, 5, the coil 38 of track relay R will be short circuited by the wheels and axles, demagnetizing magnet 37, and opening the contact at 39. This will interrupt the current in coil 43, permitting relay 44 to open. By the opening of relay 44, the current in coil 52 will be interrupted, relay 51 will open, current in coil 65 will be thereby interrupted, arm 22 will no longer be attracted by magnet 25, but will be drawn up by spring 26, and pawl 21, by reason of stop 23, will be thrown out of engagement with ratchet wheel 20, and arm 14 will fall to the horizontal or "danger" position. It can be said that the pawl 21 is pivoted to the arm 22 and held by a spring 24 up to a stop 23 fast on the arm 22, so that when the arm 22 is turned counter-clock-wise the stop 23 causes the pawl 21 to move with it and so clear the teeth of the wheel 20.

When the train has passed beyond section 2, 5, onto section 3, 6, signal arm 46 will similarly drop to the horizontal position, opening the contact between 48 and 49, thus preventing the restoration of current in coil 52. As soon as the train leaves section 2, 5, however, track relay R will be again energized, closing contact at 39, thereby restoring current in coil 43, and closing relay 44. This will establish a circuit from battery 50 via 56, 57, 31, contact finger 28 which is now in the horizontal position, 68, motor 17, 69, and 67. Motor 17 now operates to raise arm 14 into the 45° position. When arm 14 is in this position the circuit of the motor 17 is broken by the travel of the contact finger 28, which leaves contact 31 and now makes contact with 32. Current cannot be supplied to the motor 17 via contact 32, because relay 51 will be opened, owing to the fact that its energizing circuit containing coil 52 and conductor 60, will be opened by the dropping of the signal arm 46 into the horizontal position when the train is on the track circuit 36. This dropping of signal arm 46 causes contact finger 48 to leave contact 49. In the 45° position of arm 14, contact finger 29 makes contact with 33, thereby supplying current to coil 65 and bringing the pawl 21 into engagement with ratchet wheel 20, thus holding the arm 14 in this position. When the train has passed out of section 3, 6, arm 46 will assume the 45° position by means of apparatus similar to that shown in connection with semaphore S and contact will be restored between 48 and 49, thus energizing coil 52 of relay 51, closing the latter relay and thereby supplying current to motor 17 from battery 50 via 62, 63, 32, 28, 68, 17 and 69. The motor will then operate to raise the arm 14 into the vertical or 90° position. In this position of the arm the motor circuit will again be opened by the travel of contact finger 28, which will leave contact 32 and current will be supplied to coil 65 via 62, 63, 34, 29 and 64, thus holding the arm in the vertical position by means of the pawl 21 and ratchet wheel 20.

Contact finger 30 which is mounted on shaft 27 comes in contact successively with contact points 35 and 36 while signal arm 14 is traveling between its three positions, but breaks contact with each of these contact points when the arm comes to rest in either of the three positions. By making contact with either 35 or 36, finger 30 permits a comparatively heavy flow of current through low resistance coils 70 on electro-magnet 25, thus insuring that the arm 22 is brought into position to cause the pawl 21 to engage with ratchet wheel 20. This current being only momentary in duration need not be limited to the continuous capacity of the coils 70.

At $R^1$ is shown a second track relay, similar to that shown at R, but connected across section 3, 6, which serves to operate the signal bell 71 and the signal light 72, located at the highway crossing H. When there is no train on section 3, 6, relay $R^1$ will be maintained closed by reason of current from track battery 11, thus maintaining a circuit from battery 73, via 74, 75 and 76, which energizes coil 75 of relay 77, holding this relay in the open position and breaking contact at the contact points 78 and 79. When a train is on section 3, 6, the exciting coil of relay $R^1$ will be short-circuited by the wheels and axles of the train, this relay will open, thereby interrupting current in coil 75 and closing the contacts at 78 and 79. Contacts 79 close a circuit from battery 80 via 81, signal lamp 72 and 82, lighting this lamp. Contacts 78 close the circuit from a few cells of battery 80, via 83, 84, 85 and 82. Coil 85 is the operating coil of the vibrating bell 71 and current in this circuit will cause this bell to ring.

Track batteries 10, 110 and 11 and signal operating batteries 50, 40, 73 and 80 are all charged by current derived from an alternating current transmission line 84, 85. 86 is the primary winding of a transformer connected across the circuit 84, 85. This transformer is provided with three secondary windings 87, 88 and 89. Secondary winding 87 is connected to a vibrating rectifier $V^1$ consisting of an electro-magnet 90 connected across the terminals of the secondary winding 87 and a vibrating armature 91, which is polarized by a coil 92 connected across battery 10. Armature 91 being thus polarized will be attracted by alternate waves of excitation produced by coil 90 and will be repelled by the opposite waves, thus making and breaking contact at point 93 in such a way as to supply pulsating current to the battery which is always of the same polarity adapted to charge this battery.

The secondary winding 88 is connected to a similar rectifying device $V^2$, which is connected and adapted to charge battery 50. Secondary coil 89 is normally connected via 94, 98, 95 and 96 to the signal lamps 97. In this circuit is contact point 98, which is maintained closed by the attraction of electromagnet 99 so long as current is supplied thereto by secondary winding 89. If, however, the power is interrupted on the transmission line 84, 85, electromagnet 99 will lose its excitation and contact finger 98 will be retracted by the spring 100, making contact with conductor 101, thereby supplying current to the signal lamps 97 from battery 50, via 101, 98, 95, 96 and 102.

At $V^3$ and $V^7$ are shown rectifying devices similar to $V^1$ and $V^2$, supplied with current from the transformer 103, whose primary winding is connected across the circuit 84, 85. The rectifying devices $V^3$ and $V^7$ serve to charge batteries 40 and 110. Similarly at $V^4$, $V^5$ and $V^6$ are shown rectifying devices of the same type which take current respectively from transformers 104, 105 and 106 connected across the circuit 84, 85 and which serve to charge the batteries 73, 11 and 80 respectively.

It will be noted that the batteries 10, 50, 110, 40, 73, 11 and 80 are all being charged in parallel from the alternating current circuit 84, 85 through suitable transformers and rectifying devices, while at the same time each of these batteries is connected to certain signal devices and relays for controlling and operating the railway signals. Two of these batteries, 10 and 50, are connected to be charged from separate secondary windings on the same transformer, and a third secondary winding on this same transformer serves to supply current to the signal lamps 97. Thus a single transformer connected across the alternating current supply line 84, 85 is arranged to supply charging current to two batteries of different voltages, as well as to the signal lamps; one of the batteries, namely: 10, being connected to supply current to track circuit which is grounded.

From the above it will be seen that the system which we have described and which embodies features of our invention is thereby made very flexible and at the same time, simple in operation, since only one battery is required for a given service, which is maintained in a charged condition by being continually connected to the charging source. Furthermore, the work required of the batteries is reduced to a minimum, owing to the fact that the battery is connected to the signal operating circuit in parallel with the main source of current, so that whenever there is a demand for current for operating the signal devices, a part of this current is supplied directly from the source, and only a portion has to be supplied by the battery.

Having described our invention, what we claim and desire to secure by Letters Patent is—

1. In an electric signal system for railways, the combination of a plurality of electrically operated signal devices disposed along the right-of-way and of different voltages, a single charging circuit extending along the right-of-way and constituting the means for supplying power for the operation of all of said devices, a plurality of storage batteries of different voltages appropriate for the various signal devices and permanently in circuit with and in floating relation to the devices and the charging circuit, and a plurality of independent means for adapting the voltage of the charging circuit to the different batteries, whereby the signals at all times may take current of appropriate voltage from the batteries or the circuit, or both.

2. In an electric signal system for railways, the combination of a plurality of electrically operated signal devices disposed along the right-of-way, a charging circuit extending along the right-of-way and constituting the means for supplying power for the operation of all said devices, a plurality of storage batteries appropriate for the various signal devices and permanently in circuit with and in floating relation to the devices and the charging circuit, whereby the signals at all times may take current from the batteries or the circuit, or both.

In testimony whereof we have affixed our signatures in the presence of two witnesses.

ROBERT M. PHINNEY,
HAROLD M. BECK.

Witnesses:
WM. HERITAGE,
FLORENCE H. STONE.